3,106,485
Patented Oct. 8, 1963

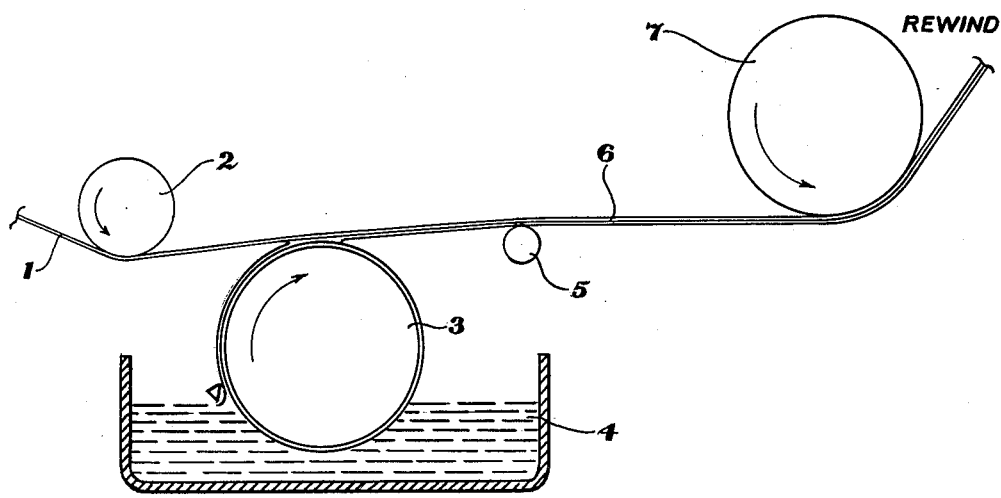

3,106,485
HYDROCARBON WAX COATINGS AND THEIR PROCESS OF PREPARATION
James E. Guillet and Harry W. Coover, Jr., Kingsport, Tenn., assignors to Eastman Kodak Company, Rochester, N.Y., a corporation of New Jersey
Filed Dec. 30, 1960, Ser. No. 79,872
16 Claims. (Cl. 117—119.2)

This invention relates to hydrocarbon wax coated substrates and their process of preparation. More particularly, this invention relates to substrates coated with a hydrocarbon wax exhibiting good toughness, moisture resistance and impermeability to gases and many liquids. In a specific aspect, this invention relates to substrates coated with polypropylene wax exhibiting the aforementioned characteristics and a novel process for preparing the same.

For a number of years, various substrates, for example, paper, metal foil and fabric have been coated with hydrocarbon waxes such as paraffin or microcrystalline wax or blends of these materials to impart such desirable properties as moisture resistance and impermeability to gases and liquids. In view of the fact that the hydrocarbon waxes have low molecular weights, it is possible to apply them to substrates cheaply and rapidly by melt coating procedures. In a conventional melt coating procedure the hydrocarbon wax is melted and applied to the substrate from a roll or by immersing the substrate in the molten wax. In general, hydrocarbon wax coatings applied by melt coating procedures are brittle and cannot be flexed or creased without cracking which destroys the moisture resistance of the coating. In an attempt to overcome this problem, it has become the practice in the art to impregnate the substrate to be coated with the hydrocarbon wax employed in the coating operation. In the case of porous substrates such as paper or fabric, for example, impregnation with a hydrocarbon wax is possible but, of course, it is not possible with nonporous substrates such as metal foil. Furthermore, even where a substrate is porous and can be impregnated with wax, such impregnation requires a much greater quantity of wax than is required to form a thin film on the surface of the substrate.

In recent years, it has become possible to coat a substrate with a high molecular weight hydrocarbon, for example, plastic-grade polyethylene, using extrusion coating procedures. In such a procedure the polymer is extruded as a continuous sheet, which sheet is then laminated to the substrate by passing the sheet and the substrate through a series of rolls. Extrusion processes, although they are more expensive than conventional melt coating procedures and generally result in a lower rate of production, are widely used because of the high quality of the coating obtained with a high molecular weight hydrocarbon.

It is evident, therefore, that the state of the art would be greatly enhanced by providing a method for applying hydrocarbon wax coatings to substrates in thin layers by melt coating procedures, which coatings would exhibit the good toughnes, moisture resistance and impermeability of high molecular weight hydrocarbon extrusion coatings. Likewise, a significant contribution to the art would be substrates coated with hydrocarbon wax coatings exhibiting the aforementioned desirable characteristics.

It is accordingly an object of this invention to provide a novel method for applying hydrocarbon wax coatings to various substrates.

Another object of this invention is to provide a novel method for applying hydrocarbon wax coatings to substrates using melt coating procedures which coatings do not exhibit the brittleness characteristics generally associated with such hydrocarbon wax coatings.

Another object of this invention is to provide hydrocarbon wax coatings which can be applied by melt coating procedures in thin layers without impregnating a substrate, which coatings exhibit the good toughness and water vapor and liquid impermeability characteristics of extrusion coatings.

Still another object of this invention is to provide novel hydrocarbon wax coated substrates exhibiting moisture resistance and impermeability characteristics unobtainable by the hydrocarbon wax coated substrates of the prior art.

Other objects and advantages of this invention will become apparent from an examination of the specification and claims which follow.

It has now been discovered that a particular type of hydrocarbon wax, as hereinafter described, will form an extremely tough coating when it is melt coated on a substrate if the coating is quenched almost immediately after it is applied to such substrate. As a result of this discovery, hydrocarbon waxes which generally give brittle coatings, can be made to form tough, moisture resistant coatings which are impermeable to gases and certain liquids. In accordance with this invention, therefore, a hydrocarbon polymer wax, as hereinafter described, in the molten state, is applied to a substrate and chilled to a temperature below the melting point of such wax, the contacting and chilling being effected substantially simultaneously.

The discovery that a particular type of hydrocarbon wax could be quenched to form a tough, moisture resistant coating was quite surprising and could not have been predicted from the prior art. Although it is known in the prior art that quenching high molecular weight plastic-grade polyolefin coatings results in an improvement in toughness, it was not known that hydrocarbon wax coatings could be treated in a similar manner to improve their toughnes. In fact, it is known that hydrocarbon waxes can be made by thermal degradation of high molecular weight polyolefins such as polyethylene and polypropylene, as shown by British Patent 569,043 and U.S. Patent 2,835,659, respectively but that the resulting hydrocarbon waxes are hard, brittle materials with melt viscosities ranging from about 50,000 to about 30 cp. at 190° C. which, when coated on paper or foil in thin layers, form brittle coatings that crack when flexed. Furthermore, even after quenching according to the process of this invention, the polyethylene waxes described in British Patent 569,043 do not give tough coatings. Moreover, not all of the polypropylene waxes described in U.S. Patent 2,835,659 form tough coatings after quenching according to the process of this invention since, in order to be useful in the proces of this invention, a hydrocarbon wax must have a melt viscosity in the range of about 500 cp. to about 50,000 cp. at 190° C. Polymers having lower melt viscosities form brittle films even after quenching, while polymers having melt viscosities in excess of 50,000 cp. generally cannot be applied to a substrate by the usual melt coating procedures. Thus, the discovery that a particular type of hydrocarbon wax would form a tough, moisture resistant coating if the coating is quenched according to the process of this invention could not have been predicted from the prior art.

It has been found that numerous hydrocarbon waxes when treated according to the process of this invention form tough, moisture resistant coatings which are impermeable to gases and many liquids. Thus, any of the well known low molecular weight hydrocarbon polymers of α-olefins containing at least 3 carbon atoms having a density in the range of about 0.83 to about 0.94 and more preferably about 0.88 to about 0.93, an inherent viscosity in the range of about .05 to about .5 and more preferably about .25 to about .45 in tetralin at 145° C., a melt viscosity in the range of about 500 to about 50,000 and more preferably about 2,000 to about 20,000 cp. at 190° C. and melting points within the range of about 45° C. to 350° C. and more preferably about 60 to about 200° C., can be employed in the process of this invention. Although any of the aforementioned waxes can be employed in the practice of this invention, it is preferred that the wax be a low molecular weight hydrocarbon homo- or copolymer of one of the well known polymerizable aliphatic α-monoolefins containing 3 to 6 carbon atoms. When copolymers of α-olefins are employed in the process of this invention, it is generally most desirable to use copolymers containing at least 50% and more preferably 80%, by weight, of one of the aliphatic α-monoolefins containing 3 to 10 carbon atoms. In addition, copolymers of α-olefins containing at least 3 carbon atoms with ethylene which are employed in the process of this invention should contain about 10 to about 20%, by weight, of the ethylene for best results. The α-olefins which are conveniently used to form the hydrocarbon waxes employed in the process of this invention can be generally described as having the formula $CH_2=CH-R$, wherein R is a hydrocarbon radical such as an aliphatic, cycloaliphatic, alkyl, alkaryl or aralkyl radical. Examples of the α-olefins include propene, butene, isobutene, 3-methyl-1-butene, pentene, decene, styrene, butadiene, hexadiene and the like.

The physical properties exhibited by the hydrocarbon waxes employed in the process of this invention can be determined using any of the accepted procedures generally employed for this purpose. For example, the melt viscosity can be determined using a standard Brookfield viscometer or a capillary melt method. In addition, the inherent viscosity of the hydrocarbon waxes employed can be determined in tetralin at 145° C., a typical procedure being described by Schulken et al. in "The Journal of Polymer Science," volume 26, page 227 (1957).

A simple test for establishing the toughness of a wax coating is the "acetone test." According to this test a wax coating on a flexible substrate is creased firmly by folding the substrate and pressing the crease with a 5 pound weight. A brittle wax coating when creased in such a manner will crack. A drop of acetone placed on the wax coating at the crease will penetrate to the uncoated surface of the substrate within 30 seconds if the coating has cracked. The hydrocarbon wax coatings available to the art prior to this invention will not pass the above-described "acetone test." In contrast, wax coatings which are quenched according to the process of this invention are not penetrated by the acetone when subjected to this same "acetone test."

In practicing this invention any of the conventional methods of melt coating and quenching can be employed. For example, the hydrocarbon wax can be applied to the substrate to be coated using a gravure roll immersed in a fountain containing the molten wax or it can be applied from a slit die onto the surface of the substrate and smoothed with a doctor blade. The most significant aspect of this invention is that the hydrocarbon wax coating must be cooled as rapidly as possible from the molten state, i.e. substantially simultaneously upon contacting the substrate. This cooling operation can generally be accomplished by passing the substrate over a chilled roll, although other methods can also be employed depending upon the type of substrate used. For example, coatings on substrates such as metal foil can be quenched by passing through a water bath maintained at a temperature substantially below the melting point of the wax. Although water is preferred, any nonvolatile liquid can be used to quench the hydrocarbon wax coatings provided that the liquid does not significantly attack or react disadvantageously with the wax film during the quenching operation. As already indicated, water is the preferred quenching agent for the water insoluble waxes of this invention although a water soluble liquid having a boiling point not substantially below that of water can also be employed. In a typical procedure the hydrocarbon wax, as described herein, is first heated to obtain a clear melt and then extruded through a suitable die onto the substrate to obtain a film of the desired thickness. The film is quenched almost immediately by passing it into cold water or by contacting it with a chilled cold roll so that the polymer is solidified and cooled to a temperature below its melting point. The rate of cooling must be as rapid as possible to limit the formation of spherulites. It is important to cool the film substantially simultaneously upon contact with the substrate, and preferably no more than 60 seconds from the moment of such contact.

In general, the process of this invention can be used to coat any substrate having a relatively smooth surface and the coating can be applied to one or both sides of the substrate. In addition to coating paper for use as overwrap in the packaging and film field, this invention can be used to coat other types of substrates such as for example, foil, glass, fabric, wood and the like.

Apparatus for operating the process hereinbefore described comprises any of the conventional hot-melt coating equipment capable of operating at elevated temperatures. A typical setup is shown by way of example in the accompanying schematic drawing which illustrates an apparatus useful for carrying out the invention, and designed for use with a chilled roll. This setup is discussed specifically with reference to polypropylene wax, although it should be understood that any of the hydrocarbon waxes described herein can be used in the same manner when suitable temperature adjustments are made. Thus, when coating paper or other substrates using polypropylene wax, the equipment must be capable of operating at a temperature of about 425° F. By means of a rewind mechanism, not shown the substrate 1 is drawn under rotating idler roll 2 and over rotating applicator roll 3 partially immersed in reservoir 4 containing molten wax where it picks up wax, then over equalizer rod 5. The coating is then rapidly quenched by passing the coated substrate 6 over rotating polished chilled roll 7. Since the melting point of polypropylene wax is in the range of about 160 to about 170° C., the minimum coating temperature is high, i.e. about 400° F. Short runs can be made in air at this temperature, but prolonged heating can cause excessive oxidation. If the wax is to remain at the coating temperature for an appreciable period of time, the melt reservoir should be blanketed with an inert gas, for example, carbon dioxide or nitrogen.

This invention can be further illustrated by the following examples of preferred embodiments thereof although it will be understood that these examples are included merely for purposes of illustration and are not intended to limit the scope of the invention unless otherwise specifically indicated:

*Example 1*

Polypropylene wax having a density of 0.91, an inherent viscosity of 0.54 in tetralin at 145° C., a melt viscosity of 23,000 cp. at 190° C. and a melting point of 160–164° C. is melted, placed in the reservoir of a melt coating machine and maintained at a temperature of 410° F. A roll of 40 pound bleached kraft paper is coated with the polypropylene wax to a depth of 1 mil at a speed of 65 feet per minute. The coated kraft paper is contacted with a chill roll cooled with water to maintain a temperature of about 18° C. within 60 seconds after being coated. The resulting coating is glossy, hard, can be flexed many times and passes the "acetone test," as described hereinbefore. The quenched coating prepared according to this example will retain its flexibility for several years at ordinary room temperature, but it tends to become brittle if stored at temperatures above about 50° C. for extended periods.

The coated paper prepared according to the procedure of this example can be heat sealed using a Doughboy continuous-type heat sealer when the seal is quenched immediately after sealing with a chilled brass plate. Seal strengths of 2.2 pounds per linear inch of seal are readily obtained by this method. In comparison, seal strengths of high molecular weight extruded polyethylene films are not appreciably greater, such seal strengths being in the range of about 2 to 3.5 pounds per linear inch.

As indicated herein, hydrocarbon wax coatings which are not quenched according to the process of this invention will form melt coatings that are brittle and cannot be flexed or creased without cracking. To illustrate, the above procedure is repeated with the exception that the chill-roll is removed and the polypropylene wax coating is allowed to cool slowly. The resulting coating is brittle and fails the "acetone test."

*Example 2*

Polypropylene wax having a density of 0.90, an inherent viscosity of 0.35 in tetralin at 145° C., a melt viscosity of 3,700 cp. at 190° C. and a melting point of 155° C. is coated on 40 lb. bleached kraft paper by the procedure of Example 1. The coating is tough, flexible, hard and passes the "acetone test." At a thickness of 1.5 mils a seal strength of 0.6 lb. per linear inch can be obtained using a Doughboy continuous sealer.

*Example 3*

Polypropylene wax having a density of 0.92, an inherent viscosity of 0.39 in tetralin at 145° C., a melt viscosity of 6,200 cp. at 190° C. and a melting point greater than 150° C. is coated on ½ mil aluminum foil by the procedure of Example 1. The coating is tough and hard and passes the "acetone test."

*Example 4*

As pointed out hereinabove, the hydrocarbon wax employed in the process of this invention can be a copolymer of an α-olefin containing at least three carbon atoms and it can be prepared by thermal degradation. Thus, a high molecular weight, crystalline copolymer of propylene with 10% hexene-1 is prepared by polymerization with an aluminum triethyl-TiCl$_4$ catalyst. After washing and removing the catalyst residues the product is thermally degraded by heating at 350° C. under vacuum for 2 hours. The resulting wax has a density of 0.89, an inherent viscosity of 0.32 in tetralin at 145° C., a melting point of about 120° C. and a melt viscosity of 5,000 cp. at 190° C.

This wax is coated on 40 lb. bleached kraft paper by the procedure of Example 1. After quenching, the coating is tough, hard, flexible and passes the "acetone test." The heat seal strength is 2.8 lb. per linear inch.

*Example 5*

As pointed out in detail hereinabove, failure to quench the hydrocarbon wax coatings according to the process of this invention results in a coating which is brittle and which will crack when flexed. To illustrate, high molecular weight poly-1-butene is prepared by polymerization of butene-1 in the presence of an aluminum triethyl-titanium trichloride catalyst. After removal of the catalyst residues the polymer is heated ½ hour at 400° C. under nitrogen. The resulting wax has a density of 0.91, an inherent viscosity of 0.44 in tetralin at 145° C., a melting point of 111° C. and a melt viscosity of 11,000 cp. at 190° C. When melted and poured on a paper surface, and allowed to cool slowly, a coating is obtained which is "cheesy" and cracks when flexed. In contrast, when this same wax is coated by the procedure of Example 1 on 50 lb. unbleached kraft paper, a tough coating is obtained which passes the "acetone test."

*Example 6*

The process described herein is selective in its application and will not result in the desired tough coatings when applied to polyethylene wax. To illustrate, a high molecular weight plastic-grade polyethylene having a density of 0.938 is thermally degraded by heating under nitrogen at 420° C. for 15 minutes. The resulting wax has a density of 0.943 and a melt viscosity of 3,500 cp. at 190° C. The wax is then coated on 40 lb. bleached kraft paper by the procedure of Example 1. The coating is hard, but not as glossy as that obtained with polypropylene waxes, and even after quenching it is brittle and cracks when flexed. The seal strength is only 0.3 lb. per linear inch.

*Example 7*

A high molecular weight crystalline copolymer of propylene with 30%, by weight, of 3-methylbutene-1 is prepared using an aluminum triethyl vanadium trichloride catalyst. After removal of the catalyst residues the copolymer is thermally modified by heating at 380° C. under vacuum for 3 hours. The resulting wax has a density of 0.88, an inherent viscosity of 0.32 in tetralin at 145° C., a melting point of 165–185° C. and a melt viscosity of 7,500 cp. at 190° C. When this wax is coated on 40 lb. bleached kraft paper by the procedure of Example 1, it gives a tough hard coating which passes the "acetone test." In contrast, the unquenched coating is brittle and will not pass the "acetone test."

Thus, by means of this invention there is provided novel hydrocarbon wax coatings exhibiting increased toughness and greater water vapor and liquid impermeability than any of the hydrocarbon wax coatings now available in the prior art. Substrates coated according to the process of this invention can be used in packaging foodstuffs, dry-goods and other articles which require protection from moisture or air. These hydrocarbon wax coatings can also be heat sealed to give excellent binds, provided the seal is cooled rapidly.

Although the invention has been described in considerable detail with reference to certain preferred embodiments thereof, it will be understood that variations and modifications can be effected without departing from the spirit and scope of the invention as described hereinabove and as defined in the appended claims.

We claim:
1. The method for providing hydrocarbon wax coatings of improved toughness which comprises contacting hydrocarbon polymer of an α-olefin containing at least 3 carbon atoms and having a density in the range of about .83 to about .94, an inherent viscosity in the range of about .05 to about .5 in tetralin at 145° C., a melt viscosity within the range of about 500 to about 50,000 cp. at 190° C., and a melting point in the range of about 45° to about 350° C., in the molten state, with a substrate and chilling said molten hydrocarbon polymer to a temperature below its melting point, said contacting and chilling being effected substantially simultaneously.

2. The process of claim 1 wherein the said molten hydrocarbon polymer is chilled to a temperature below its melting point by contacting it with a chill roll.

3. The process of claim 1 wherein said molten hydrocarbon polymer is chilled to a temperature below its melting point by contacting it with water.

4. The method for providing hydrocarbon wax coatings of improved toughness which comprises contacting hydrocarbon polymer of an α-olefin containing 3 to 10 carbon atoms and having a density in the range of about .83 to about .94, an inherent viscosity in the range of about .05 to about .5 in tetralin at 145° C., a melt viscosity within the range of about 500 to about 50,000 cp. at 190° C. and a melting point in the range of about 45° to about 350° C., in the molten state, with a substrate and chilling said molten hydrocarbon polymer to a temperature below its melting point, said contacting and chilling being effected substantially simultaneously.

5. The method for providing hydrocarbon wax coatings of improved toughness which comprises contacting hydrocarbon homopolymer of an α-olefin containing 3 to 10 carbon atoms, and having a density in the range of about .83 to about .94, an inherent viscosity in the range of about .05 to about .5 in tetralin at 145° C., a melt viscosity within the range of about 500 to about 50,000 cp. at 190° C., and a melting point in the range of about 45° to about 350° C., in the molten state, with a substrate and chilling said molten hydrocarbon homopolymer to a temperature below its melting point, said contacting and chilling being effected substantially simultaneously.

6. The method for providing hydrocarbon wax coatings of improved toughness which comprises contacting hydrocarbon copolymer of an α-olefin containing 3 to 10 carbon atoms, and having a density in the range of about .83 to about .94, an inherent viscosity in the range of about .05 to about .5 in tetralin at 145° C., a melt viscosity within the range of about 500 to about 50,000 cp. at 190° C., and a melting point in the range of about 45° to about 350° C., in the molten state, with a substrate and chilling said molten hydrocarbon copolymer to a temperature below its melting point, said contacting and chilling being effected substantially simultaneously.

7. The method for providing hydrocarbon wax coatings of improved toughness which comprises contacting hydrocarbon polymer of an aliphatic α-monoolefin containing 3 to 10 carbon atoms, and having a density in the range of about .83 to about .94, an inherent viscosity in the range of about .25 to about .45 in tetralin at 145° C., a melt viscosity within the range of about 500 to about 50,000 cp. at 190° C., and a melting point in the range of about 45° to about 350° C., in the molten state, with a substrate and chilling said molten hydrocarbon polymer to a temperature below its melting point, said contacting and chilling being effected substantially simultaneously.

8. The method for providing hydrocarbon wax coatings of improved toughness which comprises contacting hydrocarbon polymer of an aliphatic α-monoolefin containing 3 to 10 carbon atoms and having a density in the range of about .88 to about .93, an inherent viscosity in the range of about .25 to about .45 in tetralin at 145° C., a melt viscosity within the range of about 2,000 to about 20,000 cp. at 190° C., and a melting point in the range of about 60 to about 200° C., in the molten state, with a substrate and chilling said molten hydrocarbon polymer to a temperature below its melting point, said contacting and chilling being effected substantially simultaneously.

9. The method for providing hydrocarbon wax coatings of improved toughness which comprises contacting polypropylene wax having a density of 0.91, an inherent viscosity of 0.54 in tetralin at 145° C., a melt viscosity of 23,000 cp. at 190° C. and a melting point in the range of about 160 to about 164° C., in the molten state, with a paper substrate and chilling said molten polypropylene wax to a temperature below its melting point, said contacting and chilling being effected substantially simultaneously.

10. The method for providing hydrocarbon wax coatings of improved toughness which comprises contacting polypropylene wax having a density of 0.90, an inherent viscosity of 0.35 in tetralin at 145° C., a melt viscosity of 3,700 cp. at 190° C. and a melting point of 155° C., in the molten state, with a paper substrate and chilling said molten polypropylene wax to a temperature below its melting point, said contacting and chilling being effected substantially simultaneously.

11. The method for providing hydrocarbon wax coatings of improved toughness which comprises contacting polypropylene wax having a density of 0.92, an inherent viscosity of 0.39 in tetralin at 145° C., a melt viscosity of 6,200 cp. at 190° C., and a melting point greater than 150° C., in the molten state, with aluminum foil and chilling said molten polypropylene wax to a temperature below its melting point, said contacting and chilling being effected substantially simultaneously.

12. The method for providing hydrocarbon wax coatings of improved toughness which comprises contacting hydrocarbon copolymer of 90%, by weight, propylene with 10%, by weight, hexene and having a density of 0.89, an inherent viscosity of 0.32 in tetralin at 145° C., a melt viscosity of 5,000 cp. at 190° C., and a melting point of about 120° C., in the molten state, with a paper substrate and chilling said molten copolymer to a temperature below its melting point, said contacting and chilling being effected substantially simultaneously.

13. The method for providing hydrocarbon wax coatings of improved toughness which comprises contacting poly(butene-1) wax having a density of 0.91, an inherent viscosity of 0.44 in tetralin at 145° C., a melt viscosity of 11,000 cp. at 190° C. and a melting point of about 111° C., in the molten state, with a paper substrate and chilling said molten poly(butene-1) wax to a temperature below its melting point, said contacting and chilling being effected substantially simultaneously.

14. The method for providing hydrocarbon wax coatings of improved toughness which comprises contacting hydrocarbon copolymer of 70%, by weight, propylene with 30%, by weight, 3-methylbutene-1 and having a density of 0.88, an inherent viscosity of 0.32 in tetralin at 145° C., a melt viscosity of 7,500 cp. at 190° C., and a melting point within the range of about 165 to about 185° C., in the molten state, with a paper substrate and chilling said molten hydrocarbon copolymer to a temperature below its melting point, said contacting and chilling being effected substantially simultaneously.

15. A substrate having at least one surface coated with a thin, adherent wax coating of a hydrocarbon polymer of an α-olefin containing at least 3 carbon atoms, and having a density within the range of about .83 to about .94, an inherent viscosity in the range of about .05 to about .5 in tetralin at 145° C., a melt viscosity within the range of about 500 to about 50,000 cp. at 190° C., a melting point within the range of about 45° to about 350° C., and being nonpermeable for at least 30 seconds by acetone placed on a crease in a thin coating of the said hydrocarbon polymer on a flexible substrate, said crease being formed by folding such flexible substrate and pressing it with a five pound weight.

16. A substrate having at least one surface coated with a thin, adherent wax coating of a hydrocarbon polymer of an aliphatic α-monoolefin containing 3 to 10 carbon atoms, and having a density within the range of about .88 to about .93, an inherent viscosity in the range of about .25 to about .45 in tetralin at 145° C., a melt viscosity within the range of about 2,000 to about 20,000 cp. at 190° C., a melting point in the range of about 60° to about 200° C., and being nonpermeable for at least 30 seconds by acetone placed on a crease in a thin coating of the said hydrocarbon polymer on a flexible substrate, said crease being formed by folding such flexible substrate and pressing it with a five pound weight.

References Cited in the file of this patent

UNITED STATES PATENTS

| | | |
|---|---|---|
| 273,013 | Bedford | Feb. 27, 1883 |
| 318,911 | Jowitt | May 26, 1885 |
| 1,370,412 | Crowell | Mar. 1, 1921 |
| 1,466,380 | Nusbaum et al. | Aug. 28, 1923 |
| 2,337,939 | Sermattei | Dec. 28, 1943 |
| 2,753,275 | Wiles et al. | July 3, 1956 |
| 2,835,659 | Guillet | May 20, 1958 |
| 2,882,182 | Tench | Apr. 14, 1959 |
| 2,892,735 | Curler et al. | June 30, 1959 |